M. H. LANG.
TRACTION ENGINE.
APPLICATION FILED DEC. 9, 1918.
1,392,421.
Patented Oct. 4, 1921.
4 SHEETS—SHEET 4.
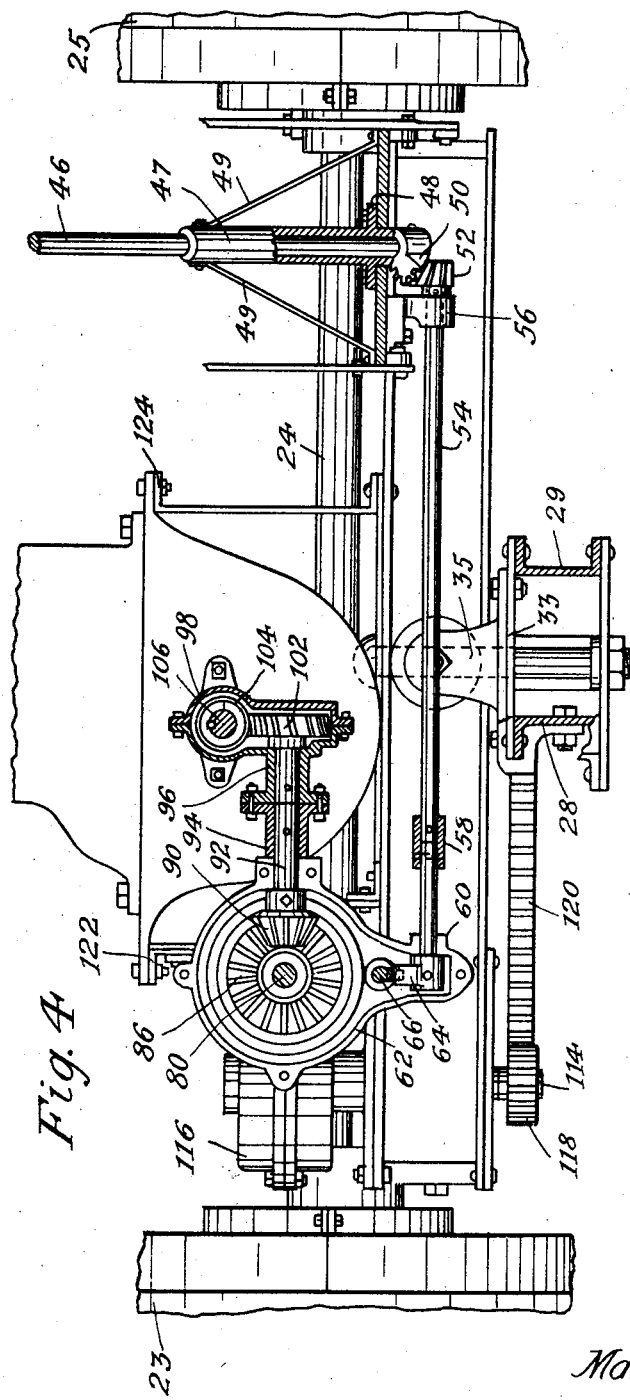
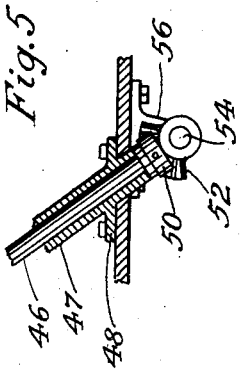
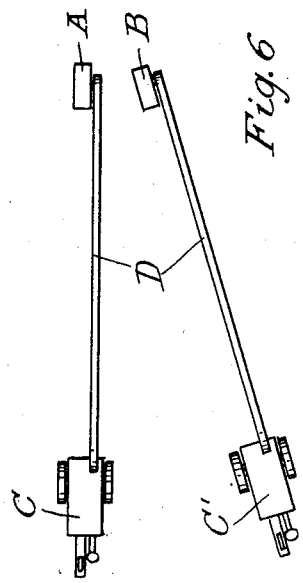
Inventor:
Martin H. Lang
By Whiteley and Ruckman
his Attorneys.

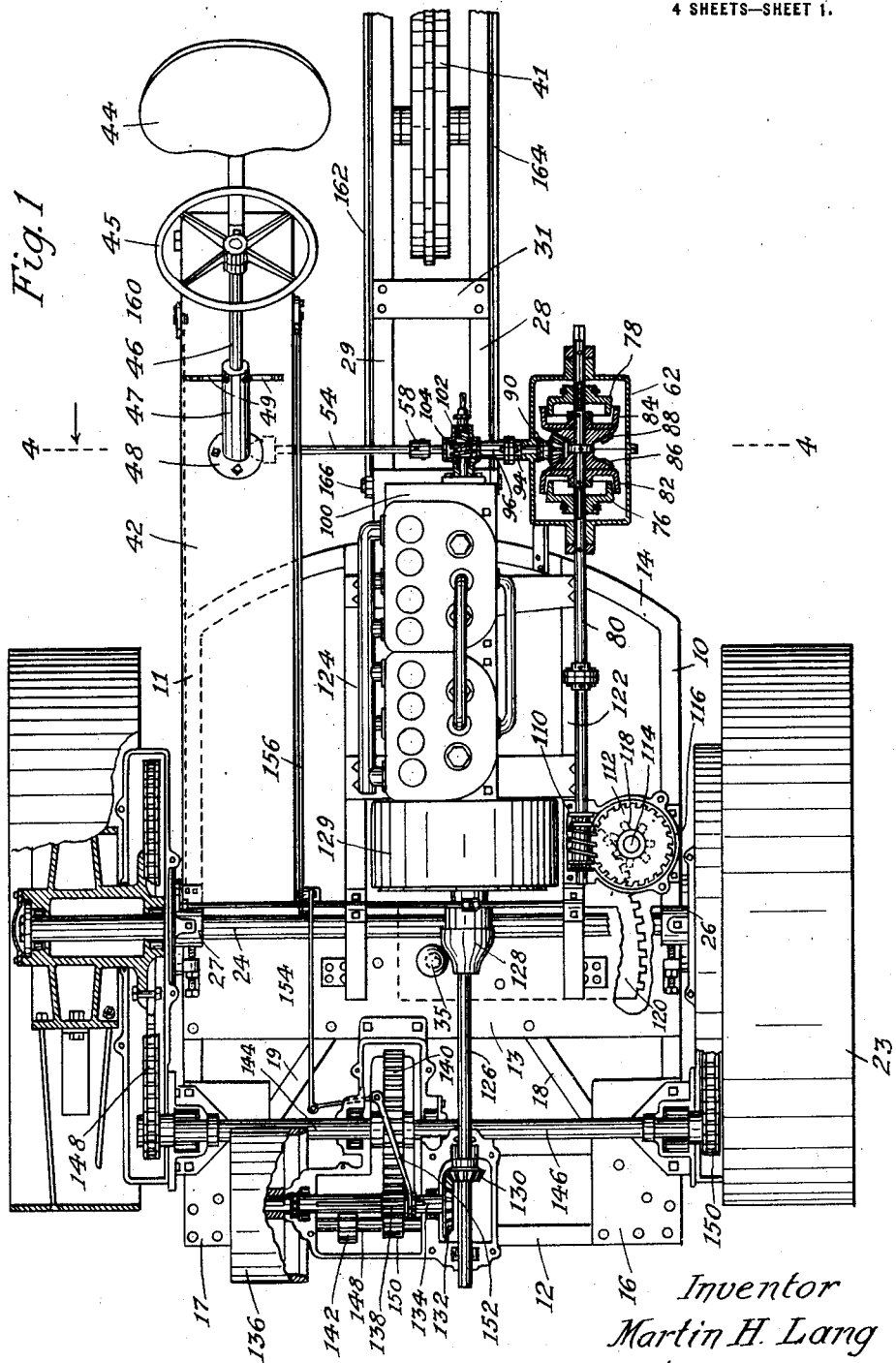

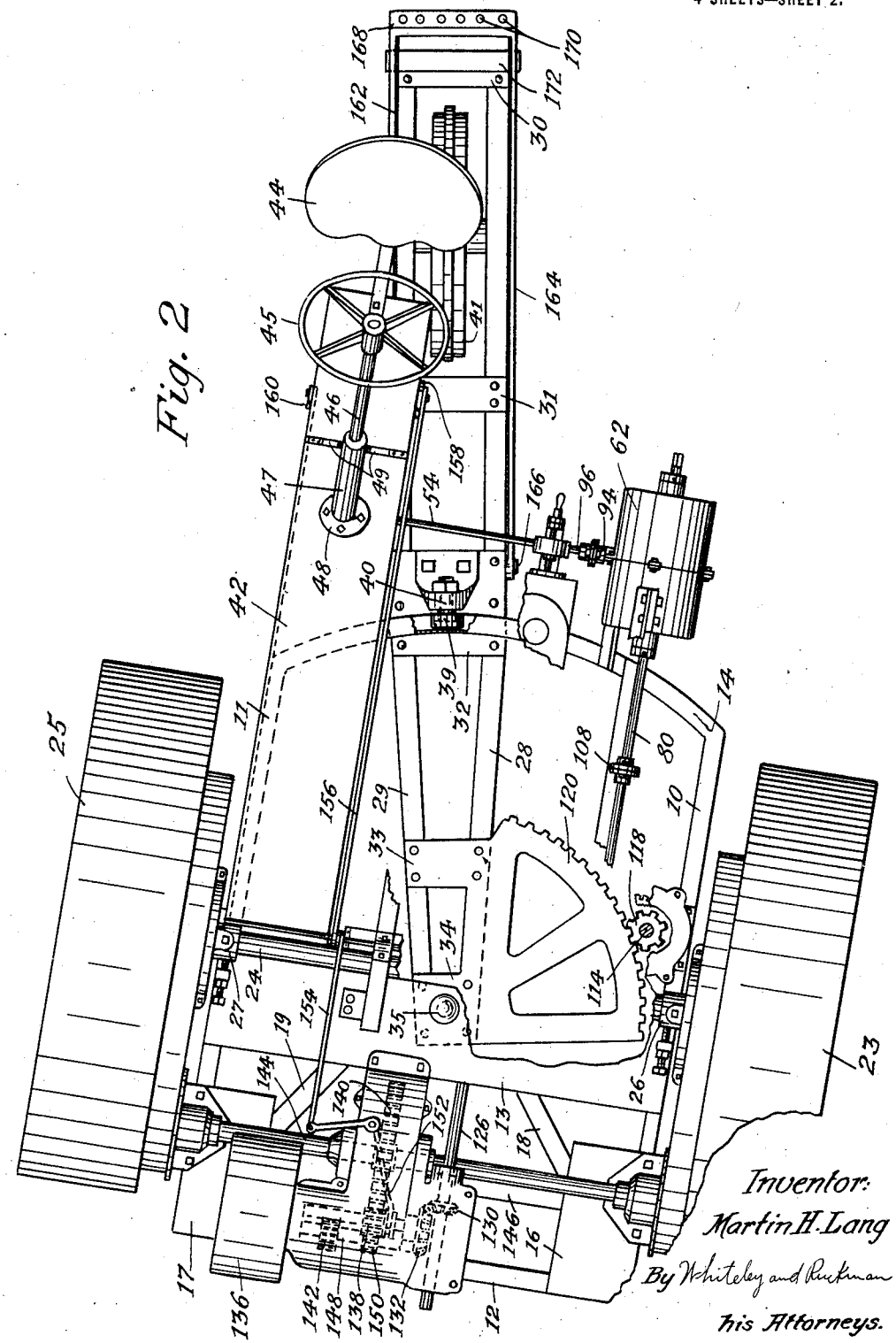

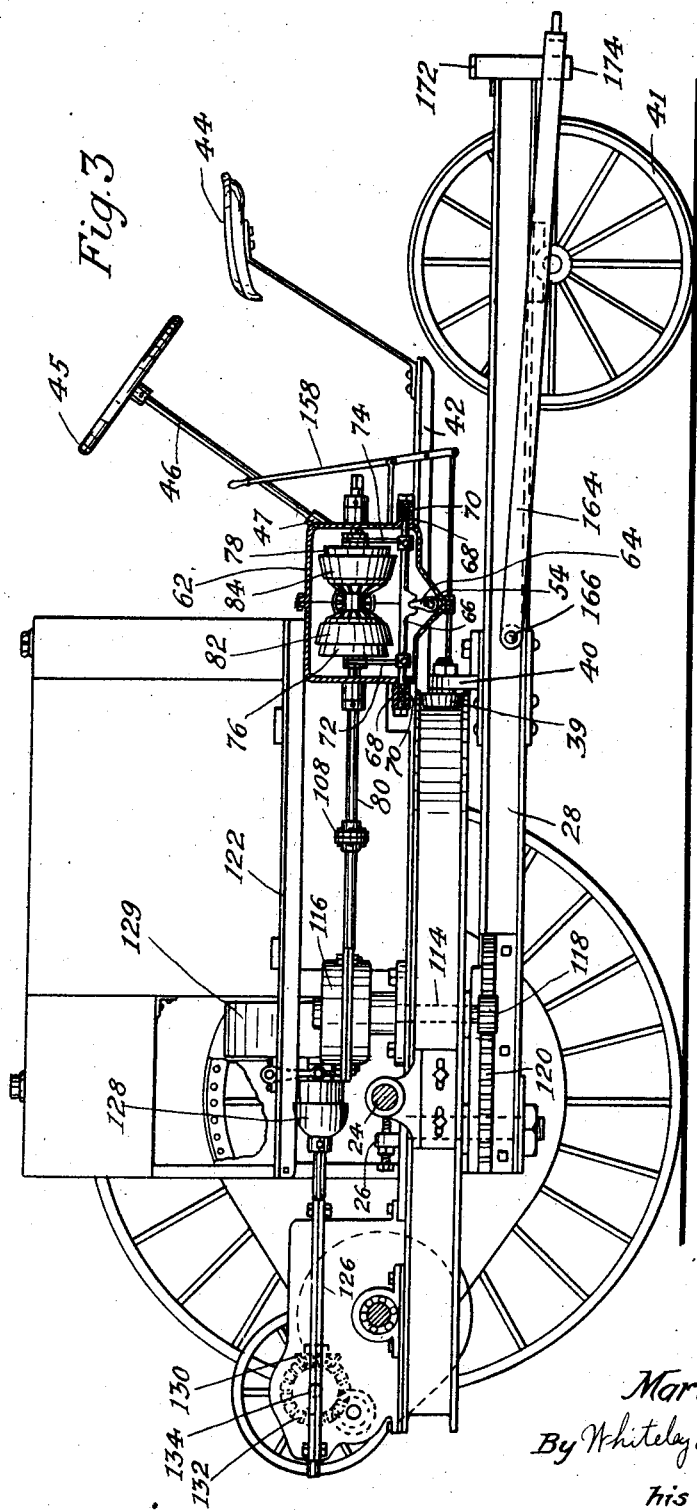

UNITED STATES PATENT OFFICE.

MARTIN H. LANG, OF MINNEAPOLIS, MINNESOTA, ASSIGNOR TO LANG TRACTOR COMPANY, OF MINNEAPOLIS, MINNESOTA, A CORPORATION OF MINNESOTA.

TRACTION-ENGINE.

1,392,421.  Specification of Letters Patent.  Patented Oct. 4, 1921.

Application filed December 9, 1918. Serial No. 265,838.

*To all whom it may concern:*

Be it known that I, MARTIN H. LANG, a citizen of the United States, residing at Minneapolis, in the county of Hennepin and State of Minnesota, have invented certain new and useful Improvements in Traction-Engines, of which the following is a specification.

My invention relates to traction engines and has for its object to provide a traction engine which is constructed so as to be steered by power from the motor. A further object is to provide a traction engine which will continue to travel for as long as desired exactly in the direction for which it is set without any attention on the part of the operator. A further object is to provide a traction engine in which the operator's seat always faces in a line at right angles to the axis connecting the steering wheels. A further object is to provide a traction engine having a fixed line of sight whereby the traction engine when used for stationary power purposes can be readily backed into a belt in proper position relatively to a machine which is to be operated thereby.

The full objects and advantages of my invention will appear in connection with the detailed description thereof and are particularly pointed out in the claims.

Referring to the drawings, which illustrate the application of my invention in one form—

Figure 1 is a plan view of my improved tractor with the hood removed and some of the parts broken away and in section. Fig. 2 is a plan view showing the engine or motor removed and having the steering mechanism operated to turn the tractor. Fig. 3 is a side elevational view of the tractor with some of the parts in section. Fig. 4 is a view mostly in vertical section on the line 4—4 of Fig. 1 looking in the direction of the arrows. Fig. 5 is a detail at right angles to the corresponding parts in Fig. 4. Fig. 6 is a diagrammatic view showing the use of the tractor for stationary power purposes.

The drive wheel frame, which is also the steering wheel frame, is preferably constructed of structural steel held together by plates and angles in the usual manner. Two longitudinal members 10 and 11 of channel section are connected by a front transverse member 12, an intermediate transverse member 13 and a curved rear transverse member 14. The latter may either be bolted to the longitudinal members 10 and 11 or may be integral therewith. Plates 16 and 17 are secured to the frame at the two front corners and the frame is braced by two diagonal members 18 and 19 secured to the plates 16 and 17 and to the transverse member 13. The frame is supported on two drive wheels 23 and 25 journaled upon a stationary axle 24 secured to the frame in suitable manner, as by a pair of castings 26 and 27 bolted thereon.

The drawbar frame, which is best shown in Fig. 2, comprises two longitudinal members 28 and 29 spaced a short distance apart with their front portions converging and secured together by a number of transverse plates 30, 31, 32, 33 and 34. The drawbar frame is pivoted to the drive wheel frame by the king bolt 35, located at a point below and in front of the drive wheel axle 24. The drawbar frame is further supported by means of the channel member 14 which is curved in the arc of a circle whose center is at the pivotal point 35. The member 14 has its flanges turned rearwardly and is adapted to serve as a track for a roller 39 rotatably mounted on a casting 40 which is secured to the drawbar frame. This roller runs between the flanges of said curved member and the diameter of the roller is substantially equal to the distance between the flanges so that the drive wheel frame has no appreciable vertical motion relatively to the drawbar frame, but permits the drive wheel frame to be oscillated for steering purposes. Between the drawbar frame members at the rear is rotatably mounted a trailing wheel 41 which serves to support the rear of this frame. Upon the rear end of a platform 42 secured at its front to the drive wheel frame is an operator's seat 44 in proper relation to which is located a hand wheel 45. This wheel is secured to the upper end of a shaft 46 which is journaled in a tubular bearing 47 secured to the platform by a flange 48 and braces 49. To the lower end of the shaft 46 is secured a segmental gear 50 meshing with a segmental gear 52 secured to a shaft 54 which is mounted in a bearing 56 supported on the platform 42. The shaft 54 is preferably made in two parts connected by the sleeve 58, and the outer end of this shaft is mounted in a bearing 60 formed upon the lower end of a gear case 62 which is secured to the frame. The extreme outer end of the shaft 54 has secured to it a crank 64 which engages within the notched portion of a sliding rod 66. This rod, as best shown in Fig. 3, has its ends mounted for sliding movement in recesses in the gear case 62, these recesses being formed by hollow extensions 68 on the gear case which contain springs 70 seated against the ends of the rod 66. Secured to this rod are two arms 72 and 74, the forked ends of which engage in grooves on reduced portions of the two clutch members 76 and 78 splined on a shaft 80. As best shown in Fig. 1, adapted for coöperation with these two clutch members are two clutch members 82 and 84 loosely mounted on the shaft 80; and fast to these latter clutch members are bevel gears 86 and 88 in mesh with the bevel gear 90 on one end of a shaft 92, as best shown in Fig. 4, and mounted in the members 94 and 96 of a divided bearing which connects the gear case 62 and a gear case 98 secured to the rear of an engine casing 100. On the other end of the shaft 92 is secured a worm gear 102 in mesh with a worm 104 fast on the rear end of an engine shaft 106. The shaft 80 is preferably made in two parts coupled together at 108, and secured on the forward end of said shaft is a worm 110, best shown in Fig. 1, meshing with a worm wheel 112 on the upper end of a shaft 114, the worm gearing being contained in a gear casing 116 having bearings for the shafts 80 and 114. On the lower end of the shaft 114 is a pinion 118 meshing with a segmental rack 120 secured to the frame, as best shown in Fig. 2, by being formed integral with the plates 33 and 34. It will now be apparent, especially from Fig. 2, that with the exception of the drawbar frame, the whole tractor, including the operator's platform, turns with the drive wheel frame.

The location and mounting of the engine is best shown in Figs. 1 and 3. Two longitudinal members 122 and 124 are mounted on the frame and the engine is supported on these members so as to be somewhat raised from the frame proper. A shaft 126 is adapted to be connected with the engine shaft 106 in the usual way through a universal coupling 128 and a clutch of any suitable construction within the fly-wheel 129. On the shaft 126 is a bevel gear 130 meshing with a bevel gear 132 on a shaft 134, on the outer end of which is a pulley 136 which may be used for obtaining power for stationary purposes. Splined on the shaft 134 is a pinion 138 adapted to mesh with either a gear 140 or a pinion 142 in order to give a forward or a reverse direction of travel of the tractor. The gear 140 is included in the customary differential, which it is not necessary to illustrate in detail, and which couples the shafts 144 and 146 together. The pinion 142 is secured to a stub shaft 148 to which is also secured a pinion 150 meshing with the gear 140. The shafts 144 and 146 are geared to the drive wheels 23 and 25 by gearing 148 and 150 in the manner disclosed in my Letters Patent of the United States, No. 1,259,878, dated March 19, 1918. The pinion 138 can be shifted through a forked lever 152 connected by links 154 and 156 to the hand lever 158 pivoted to the platform 42 within reach of the operator. On the other side of the platform is a foot pedal 160 for controlling the brake and the clutch in the usual manner.

The rear wheel frame serves as a drawbar frame, and for this purpose bars 162 and 164 are pivoted at 166 to said frame and at their rear ends these bars are joined by a transverse portion 168 provided with a series of holes 170 to which the attachment can be made as desired. For limiting the up-and-down movement of the bars 162 and 164 the frame is provided with upper and lower transverse plates 172 and 174 which project beyond the bars.

As previously stated, except for the drawbar frame, the entire tractor, including the operator's platform, turns with the drive wheel frame. This construction is of particular advantage when a tractor is used for stationary power purposes, since, as will be obvious from Figs. 1 and 2, the operator when occupying the seat 44 is at all times directly behind and in line with the stationary power belt pulley 136. When it is desired to operate a machine such as a threshing machine, for instance, from the tractor, the operator can back the tractor into the belt into the proper alinement by sighting across the belt pulley 136. Furthermore, when there are a number of stationary machines which it is desired to operate at different times from the tractor, it will be evident from Fig. 6 that the tractor can be readily swung into position when it is desired to change from one to the other. In this figure A and B represent two different machines to be operated by a belt D from the tractor, while C and C' represent the corresponding properly alined positions of the tractor. It is evident that the operator by sighting across the belt pulley 136 can quickly bring the tractor into proper alinement with the particular machine to be operated and maintain this alinement while backing into the belt.

The advantages of my invention will be obvious from the foregoing description. The tractor is particularly easy to steer since the motor does the work for this purpose. The only effort required on the part of the operator is to turn the hand wheel 45 to slide either the clutch member 76 or the clutch member 78 for obtaining the proper clutching engagement. As soon as the operator releases the hand wheel, the clutch is disengaged by the action of the spring 70 and the tractor will continue to travel in exactly the position for which it is set until a further change of direction is desired. That this result will occur is evident from Fig. 1, since the steering is performed through the low-pitch worm 110. By referring to Fig. 2 it will be seen that the operator while sighting across the belt pulley can easily steer in the desired direction either forward or backward.

I claim:

1. A traction engine comprising a frame, a pair of drive wheels supporting said frame, a motor and transmission elements on said frame for driving said drive wheels, a stationary power pulley rotatably mounted on said frame, an operator's platform secured to said frame to turn therewith and extending rearwardly in alinement with said pulley, an operator's seat on said platform, and means controlled by the operator from his seat for oscillating said frame to steer the engine.

2. A traction engine comprising a frame, a pair of drive wheels supporting said frame, a motor and transmission elements on said frame for driving said drive wheels, a drawbar frame pivotally connected with said drive wheel frame, a wheel for supporting the rear end of said drawbar frame, a stationary power pulley rotatably mounted on said drive wheel frame, an operator's platform secured to said frame to turn therewith and extending rearwardly in alinement with said pulley, an operator's seat on said platform, and means controlled by the operator from his seat for oscillating the drive wheel frame relatively to the drawbar frame to steer the engine.

In testimony whereof I hereunto affix my signature.

MARTIN H. LANG.